Feb. 13, 1923.
E. L. STINN.
BATTERY BOX AND METHOD OF MAKING SAME.
FILED APR. 17, 1922.
1,445,565.
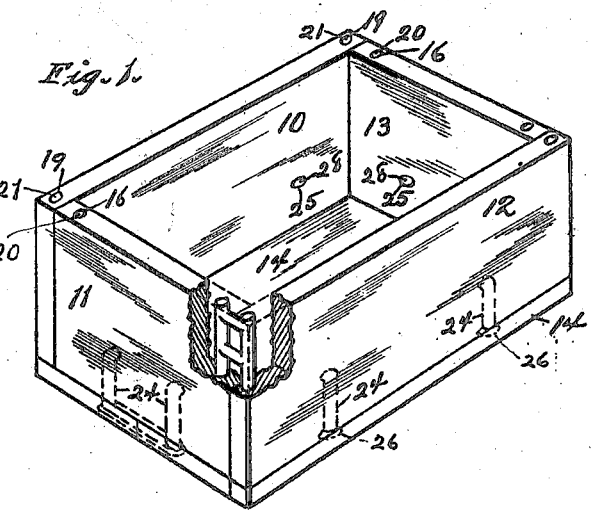
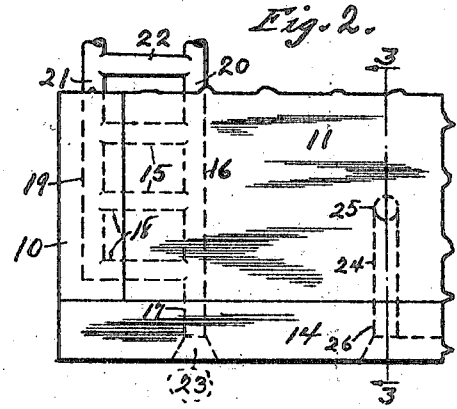
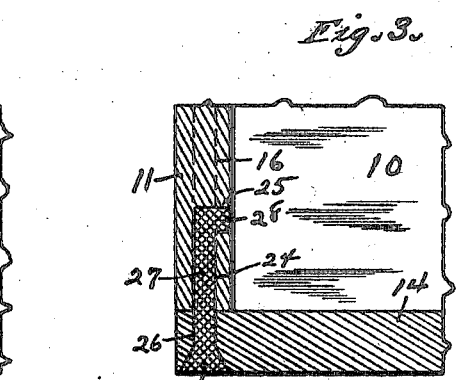
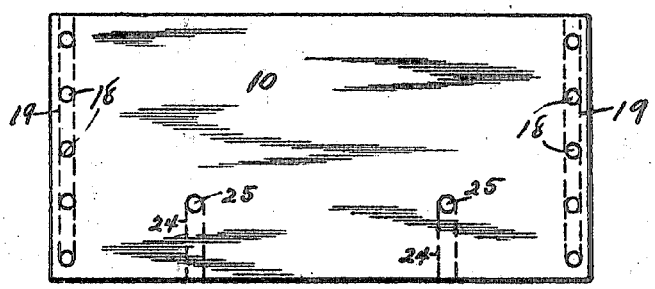
Inventor:
Edward L. Stinn Patented Feb. 13, 1923.

1,445,565

UNITED STATES PATENT OFFICE.

EDWARD L. STINN, OF EARLING, IOWA.

BATTERY BOX AND METHOD OF MAKING SAME.

Application filed April 17, 1922. Serial No. 554,034.

*To all whom it may concern:*

Be it known that I, EDWARD L. STINN, a citizen of the United States of America, and resident of Earling, Shelby County, Iowa, have invented a new and useful Battery Box and Method of Making Same, of which the following is a specification.

An object of this invention is to provide improved means and method of connecting side walls of a box.

A further object of this invention is to provide improved means and method of connecting the bottom of a box to the side walls thereof.

My invention consists in the improved method and means hereinafter set forth, pointed out in my claims and illustrated by the accompanying drawing, in which—

Figure 1 is a perspective of a box embodying my invention. Figure 2 is an elevation, in detail, of a corner portion of the box, showing samples of the connectors. Figure 3 is a vertical section on the indicated line 3—3 of Figure 2, on an enlarged scale. Figure 4 is an inner face elevation of one side wall of the box.

In the construction of the box as shown the numerals 10, 11, 12, 13 designate side walls and 14 a bottom plate, preferably made of wood. The walls 10 and 12 are arranged at right angles to and overlap the ends of the walls 11 and 13, and the bottom plate 14 overlaps the lower margins of said walls. Horizontal holes 15 are formed in the end portions of the walls 11 and 13 and the inner ends of said holes intersect and communicate with vertical holes 16 in said walls while the outer ends of said horizontal holes open through the end faces of said walls. The vertical holes 16 extend entirely through the walls 11 and 13 and communicate at their lower ends with holes 17 in the bottom plate 14, the latter holes being countersunk at their outer ends. Lateral holes 18 are formed in end portions of the walls 10 and 12 and the inner end portions of said holes communicate with vertical wells 19 in said walls, which wells open to the upper margin of said walls but do not extend through the bottom margins thereof. The holes 18 open through the inner faces of the walls 10 and 12 and are adapted to register with the outer ends of the holes 15 when the walls are assembled as shown. Molten metal, such as lead or an alloy thereof, is poured into the holes 16 and flows within and through and fills the holes 15, 17, 18 and wells 19, the lower ends of the holes 17 being overlaid as by a bench or table on which the bottom plates 14 is supported. The metal cools, hardens and shrinks or contracts in the holes 15, 17 and 18 and draws the members rigidly together and forms grids at the angles of the walls consisting of posts 20, 21 and cross-bars 22, a headed stud 23 also being formed at the lower end of each post 20 and constituting part of each grid. The connection of the bottom plate 14 to the side walls may be further developed as follows: Parallel spaced vertical holes 24 are formed in the lower portion of each wall 10, 11, 12, 13, between the ends thereof, and communicate at their upper ends with lateral holes 25 in and opening to the inner faces of said walls. Vertical holes 26 are formed in the bottom plate 14, register at their upper ends with the lower ends of the holes 24 and are countersunk in their lower ends opening through the lower face of the bottom plate. Molten metal, such as above suggested, is poured into the holes 26, the box being inverted for such purpose, and flows through and fills to holes 24 and 25, the outlets of the holes 25 being stopped, at opportune times, to check flow of the metal therefrom by applying thereto a suitable plate or tool. The metal cools, hardens and shrinks within the holes 25, 26 and 24 and rigidly binds the bottom plate to the walls supplemental to the connection provided by the grids and, in doing so, forms keys 27 having lateral heads 28 at one end and countersunk heads 29 at the opposite end. The projecting ends of the grids and keys are pared flush with the wooden member related thereto. The metal suggested is of sufficient strength to retain the wooden members in permanent connection; and the box so made may be used for any suitable purpose and particularly for battery cases or containers.

I claim as my invention—

1. A box having side walls and a bottom, the walls being formed with vertical holes and lateral recesses communicating therewith and connected by metal molded therein, and the bottom being connected to the walls by metal molded therein.

2. A box having side walls and a bottom, the walls being connected by metal molded therein, the same metal extending through and molded in the bottom and connecting said bottom and walls.

3. A box having side walls and a bottom, the walls being connected by metal molded therein, the same metal extending through and molded in the bottom and connecting said bottom and walls, said bottom and walls being further connected by metal molded therein intermediate of the first connections.

4. The method of making a box, which consists in forming holes in the walls of the box in the plane of the width of said walls, forming transverse holes in the walls communicating with the first holes, arranging the walls so that the transverse holes in one wall communicate with the transverse holes in an abutting wall, and pouring molten metal in said holes.

5. The method of making a box, which consists in forming holes in and extending through the walls of the box in the plane of the width of the walls, forming transverse holes in the bottom of the box, forming transverse holes in the walls communicating with the first holes, arranging the walls so that the transverse holes in one wall communicate with the transverse holes in an abutting wall, arranging the bottom so that the transverse holes therein register with one or another of the first holes, and pouring molten metal in said holes.

Signed at Earling, in the county of Shelby and State of Iowa, this 7" day of March, 1922.

EDWARD L. STINN.